Patented Oct. 6, 1925.

1,556,512

UNITED STATES PATENT OFFICE.

VIRGIL LEROY FARRINGTON AND EDWIN T. ALDERMAN, OF NEVADA, IOWA.

CEMENTING AND COATING COMPOSITION.

No Drawing. Application filed June 14, 1922, Serial No. 568,241. Renewed February 14, 1925.

*To all whom it may concern:*

Be it known that we, VIRGIL LEROY FARRINGTON and EDWIN T. ALDERMAN, citizens of the United States, both residing at Nevada, in the county of Story and State of Iowa, have invented certain new and useful Improvements in Cementing and Coating Compositions; and we do hereby declare the following to be a full, clear, and exact description of the invention, such as will enable others skilled in the art to which it appertains to make and use the same.

The present invention relates to compositions for coating surfaces and securing surfaces together and more especially the surfaces of photographic films. While designed more particularly for use with moving picture films, it is not limited to this use.

Among the objects of this invention, are to provide a composition which may be easily applied to picture films, to protect the picture side thereof, without discoloring the film or clouding its transparency and when so applied will render the film substantially free from scratching effects; to produce a composition of the character stated which may also be used as a cement in the repairing of broken films, or the joining of separate films; to provide a coating composition or cement which will not reduce the transparency of films used for projection purposes; to provide a composition of the character stated which may be economically produced; and such further objects, advantages and capabilities as will later more fully appear.

Our invention further resides in the process and the combination of substances herein disclosed, together with their technical equivalents, and, while we have disclosed herein a preferred form of execution of this invention, we desire the same to be understood as illustrative only, and not as limiting said invention.

In a preferred form of execution of this invention, there is added to a cellulose base, such as nitrocellulose denatured alcohol, ether, amyl acetate and acetone. This is preferably though not necessarily carried out in the following order: To the nitrocellulose is added sufficient acetone to reduce the former to a gelatinous mass—approximately in the proportion of 100 parts of the former to 200 parts of the latter. To this mass is then added ether, amyl acetate, and denatured alcohol approximately as here shown:—

| | Parts. |
|---|---|
| Nitrocellulose | 100 |
| Acetone | 200 |
| Ether | 25 |
| Amyl acetate | 50 |
| Denatured alcohol | 100 |

The above ingredients are thoroughly mixed into a homogeneous composition which will be fluid in form and can be applied by means of a brush, sponge or in other suitable manner. After being applied the volatile parts will evaporate, leaving a hard, flexible coating on the surface of the film to protect the picture thereon.

Several variants of the above composition, which is used primarily for the coating of films, have been tried, one of these being approximately as follows:—

| | Parts. |
|---|---|
| Nitrocellulose | 100 |
| Acetone | 200 |
| Ether | 100 |
| Amyl acetate | 200 |
| Denatured alcohol | 200 |

This is prepared in the same way as the composition given above and has been found very effective in the splicing of films.

The ingredients used in the preparation of these compositions may be commercial grades, if desired, having a purity sufficient to provide the necessary transparency and comparative freedom from color to not interfere with light transmission when they have been applied to a film.

It is of course understood that the specific description of composition and method set forth above may be departed from without departing from the spirit of our invention, as set forth in this specification and the appended claims.

Having now described our invention, what is claimed is:

1. A composition for coating or cementing films, comprising in combination approximately four parts of nitrocellulose, eight parts of acetone, one part of ether, two parts of amyl acetate and four parts of alcohol.

2. A composition for coating or cementing films, comprising approximately four parts of nitrocellulose, eight parts of acetone, one to four parts of ether, two to eight parts of amyl acetate, and four to eight parts of alcohol.

VIRGIL LEROY FARRINGTON.
EDWIN T. ALDERMAN.